US012767448B2

(12) United States Patent
MacLachlan

(10) Patent No.: US 12,767,448 B2
(45) Date of Patent: Oct. 20, 2026

(54) SHORT TAKE-UP BELT CONVEYOR

(71) Applicant: Laitram, L.L.C., Harahan, LA (US)

(72) Inventor: Gilbert J. MacLachlan, Harahan, LA (US)

(73) Assignee: Laitram, L.L.C., Harahan, LA (US)

( * ) Notice: Subject to any disclaimer, the term of this patent is extended or adjusted under 35 U.S.C. 154(b) by 63 days.

(21) Appl. No.: 18/864,064

(22) PCT Filed: May 12, 2023

(86) PCT No.: PCT/US2023/022037
§ 371 (c)(1),
(2) Date: Nov. 8, 2024

(87) PCT Pub. No.: WO2023/249745
PCT Pub. Date: Dec. 28, 2023

(65) Prior Publication Data

US 2025/0296781 A1 Sep. 25, 2025

Related U.S. Application Data

(60) Provisional application No. 63/354,729, filed on Jun. 23, 2022.

(51) Int. Cl.
*B65G 23/12* (2006.01)
*B65G 17/18* (2006.01)
*B65G 23/06* (2006.01)

(52) U.S. Cl.
CPC ............ *B65G 23/12* (2013.01); *B65G 23/06* (2013.01); *B65G 17/18* (2013.01)

(58) Field of Classification Search
CPC ........ B65G 23/12; B65G 23/06; B65G 17/18; B65G 23/44
See application file for complete search history.

(56) References Cited

U.S. PATENT DOCUMENTS

| | | | | | |
|---|---|---|---|---|---|
| 2,986,267 | A * | 5/1961 | Carlson | B65G 23/44 | 198/810.04 |
| 5,967,296 | A * | 10/1999 | Dolan | B65G 39/16 | 198/853 |
| 6,550,604 | B2 * | 4/2003 | MacLachlan | B65G 27/16 | 198/635 |

(Continued)

FOREIGN PATENT DOCUMENTS

| | | |
|---|---|---|
| CN | 102874589 B | 3/2016 |
| CN | 210285612 U | 4/2020 |

(Continued)

OTHER PUBLICATIONS

JP-5883608-B2 and translation (Year: 2016).*

(Continued)

*Primary Examiner* — Mark A Deuble
(74) *Attorney, Agent, or Firm* — James T. Cronvich

(57) ABSTRACT

A belt conveyor in which a positively driven short pitch conveyor belt is driven around a tight transfer nose roller by a drive arrangement in which a snub roller is positioned between the nose roller and a drive sprocket. A short take-up belt catenary depends directly from the belt's release point from the sprocket to provide back tension for effective sprocket-belt engagement.

18 Claims, 2 Drawing Sheets

(56) References Cited

U.S. PATENT DOCUMENTS

| | | | | |
|---|---|---|---|---|
| 7,134,544 | B1 * | 11/2006 | Kilper | B65G 23/44 198/813 |
| 8,715,119 | B1 | 5/2014 | Johnson et al. | |
| 9,290,324 | B2 * | 3/2016 | Haas | B65G 15/62 |
| 9,527,673 | B2 * | 12/2016 | Bogle | B65G 21/18 |
| 11,186,439 | B2 * | 11/2021 | Hoff | B65G 23/04 |
| 2005/0183932 | A1 | 8/2005 | Angleitner | |
| 2018/0105366 | A1 * | 4/2018 | de Lore | B65G 23/44 |
| 2018/0319602 | A1 * | 11/2018 | German | B65G 39/09 |
| 2019/0239684 | A1 * | 8/2019 | Sahlström | A47J 37/044 |
| 2024/0174448 | A1 * | 5/2024 | Menke | B65G 15/02 |

FOREIGN PATENT DOCUMENTS

| | | | | |
|---|---|---|---|---|
| CN | 112644977 | A | 4/2021 | |
| CN | 113479561 | A | 10/2021 | |
| EP | 0776837 | A1 * | 6/1997 | B65G 23/12 |
| WO | 2017-192329 | A1 | 11/2017 | |
| WO | WO-2019177455 | A1 * | 9/2019 | B65G 23/06 |

OTHER PUBLICATIONS

DE-3306079-A! and translation (Year: 1984).*
European Search Report, European Application No. 23827676.0, mailed Jun. 1, 2026, European Patent Office, Munich, Germany.

* cited by examiner

SHORT TAKE-UP BELT CONVEYOR

BACKGROUND

The invention relates to power-driven conveyors and more particularly to positively driven belt conveyors with short take-up catenaries.

Positively driven conveyor belts, as opposed to friction-driven flat conveyor belts, have regularly spaced drive-receiving faces that are engaged and driven by similarly spaced drive faces on drive sprockets or drive-drum lagging. Positively driven conveyor belts may be homogeneous, generally flat plastic belts with regularly spaced drive-receiving faces, or they may be modular conveyor belts constructed of rows of belt modules joined at articulation joints by hinge rods. Positively driven conveyor belts are commonly driven by drive sprockets at the exit end of a conveyor carryway.

Belt conveyors are often used to convey products having small footprints. But the transfer of such products off the exit end of a belt conveyor and onto the infeed end of an outfeed conveyor must be tight to prevent the small-footprint products from toppling. Tight transfers are enabled by positioning a small-diameter nose bar or nose roller 10, instead of a larger-diameter drive sprocket, at the exit end of the conveyor 12, as shown in FIG. 1. A modular conveyor belt 14 with a short pitch (the distance between consecutive drive-receiving faces or between consecutive hinge rods 16) can turn tightly around the small-diameter nose roller 10.

As shown in FIG. 1, the conveyor belt 14 is conventionally driven by a drive sprocket 18 positioned below and after the nose roller 10 along the belt path. A snub roller 20 above and after the drive sprocket 18 is used to increase the amount of belt wrap around the sprocket. After leaving the snub roller 20, the belt 14 forms a catenary sag between the snub roller and a downstream return roller 22 in a returnway. The catenary sag forms a take-up region 24 of the returnway. The belt catenary in the take-up region 24 allows for changes in the length of the belt 14 due to temperature, wear, and product load. And the weight of the belt in the catenary sag provides back tension directly after the sprocket for reliable sprocket-belt engagement. But the length of the take-up region 24 in the returnway can be long.

If the conveyor belt 14 is narrow or otherwise light in weight, the amount of back tension it can exert is small. In that situation the sprocket 18 cannot accelerate the belt 14 forward as it should. And the situation is even worse with lightweight sideflexing, or radius, belts, whose pitch can change as its rows collapse or expand. One solution is to set a weighted take-up roller on the belt in the returnway. But weighted take-up rollers are not favored by many users.

SUMMARY

One version of a belt conveyor embodying features of the invention comprises a carryway, a positively driven conveyor belt driven in a travel direction along a belt path including the carryway, and a nose element at an exit end of the carryway around which the travel direction of the conveyor belt changes. A drive arrangement is disposed below the exit end and includes a drive sprocket positively driving the conveyor belt and a snub roller positioned between the nose element and the drive sprocket to guide the conveyor belt to be engaged by the drive sprocket at its top dead center.

Another version of a belt conveyor comprises a conveyor belt including an outer side and an opposite inner side having drive-receiving elements, a carryway having an exit end, and a returnway below the carryway. The conveyor belt is driven in an endless belt path that includes a carryway path segment along which the conveyor belt conveys articles on the outer side in a conveying direction to the exit end, a returnway path segment along which the conveyor belt is driven back to the carryway, and a drive path segment extending from the carryway path segment at the exit end of the carryway to a take-up path segment of the returnway path segment. A drive sprocket in the drive path segment has a periphery with drive elements engaging the drive-receiving elements on the inner side of the conveyor belt to drive the conveyor belt along the endless path. A snub roller in the drive path segment between the exit end of the carryway and the drive sprocket is in contact with the outer side of the conveyor belt as it changes direction around the snub roller to a release point at which the conveyor belt departs from the snub roller at a first level. The conveyor belt in the drive path segment is driven from the snub roller to a point of initial engagement on the drive sprocket at a second level. The first level is lower than the second level so that the conveyor belt travels against gravity between the snub roller and the drive sprocket.

DETAILED DESCRIPTION

Figure 2:
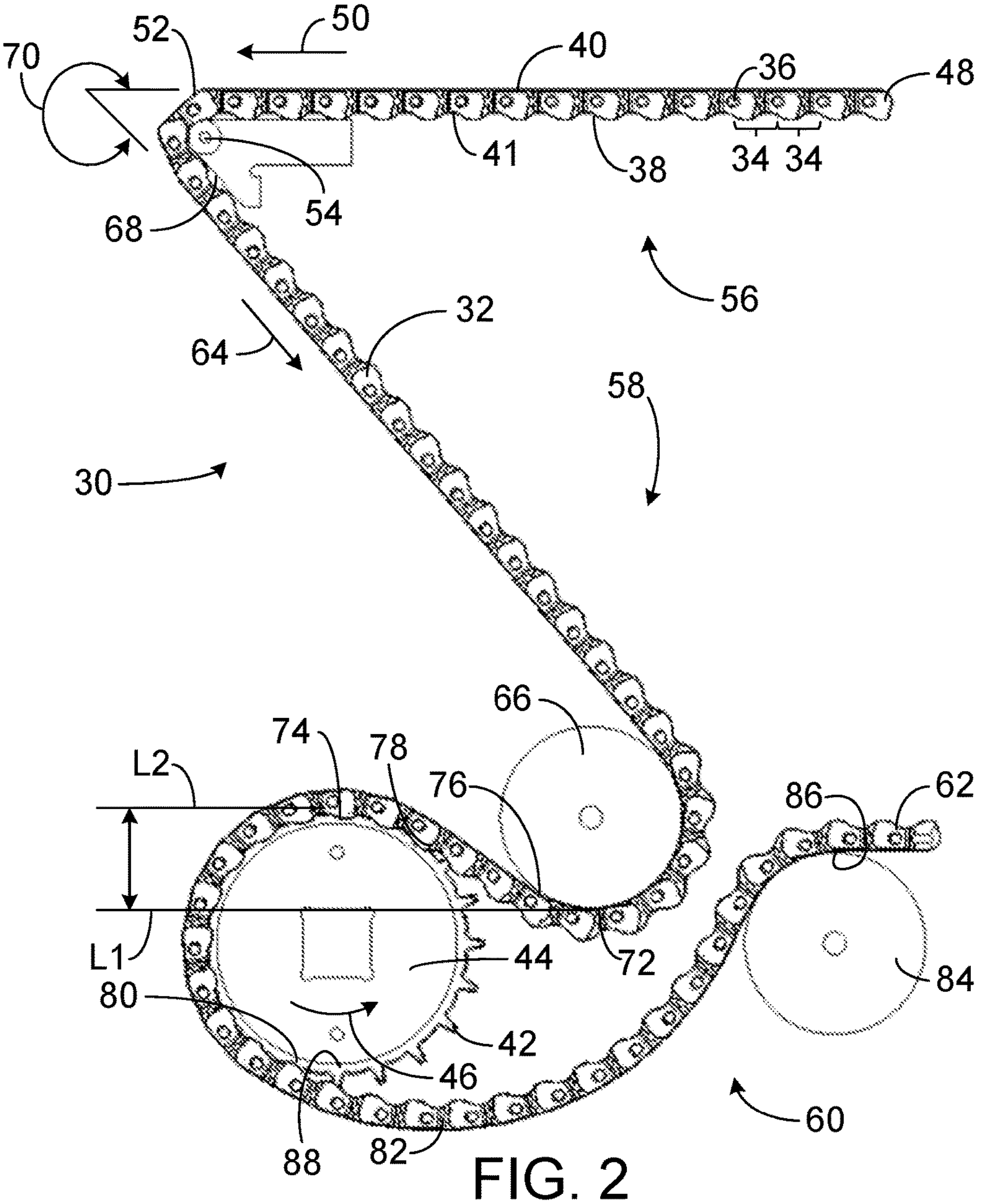
FIG. 2 is a side elevation view of the exit end of one version of a belt conveyor embodying features of the invention.

The exit portion of one version of a belt conveyor with a short take-up and no weighted take-up roller is shown in FIG. 2. The belt conveyor 30 includes a positively driven modular conveyor belt 32 constructed of a series of rows 34 of one or more modular belt links, or modules. The rows 34 are joined together into an endless loop by hinge rods 36 at hinge joints 38 at which the belt 32 can articulate. The conveyor belt 32 has an article-supporting outer side 40 and an opposite inner side 41. Formed on the inner side 41 are drive-receiving elements, such as drive pockets (not shown), regularly spaced along the length of the belt 32. The drive-receiving elements are positively engaged and driven by drive elements, such as teeth 42, regularly spaced on the periphery of a motor-driven drive sprocket 44 rotating in the direction of the arrow 46.

Articles are conveyed atop the outer side 40 of the belt 32 along an upper carryway 48 in a conveying direction 50 to an exit end 52. To facilitate the transfer of small-footprint articles off the exit end 52, a small-diameter nose element, such as a nose bar or, as in FIG. 2, a nose roller 54, changes the belt's travel direction from the conveying direction 50.

The endless belt path is composed of four main path segments: (a) a carryway path segment 56 that extends to the exit end 52 from an entrance end (not shown) at the start of the carryway 48; (b) a serpentine drive path segment 58 on which the belt 32 engages the drive sprocket 44; (c) a returnway path segment 60 in a lower returnway 62 on which the belt returns inner side up opposite to the conveying direction 50 toward the entrance end of the conveyor 30;

and (d) a transition path segment (not shown) on which the belt transitions from the lower returnway to the upper carryway.

Around the nose roller 54, the travel direction of the conveyor belt 32 changes from the conveying direction 50 on the carryway path segment 56 to an oblique downward direction 64 on the drive path segment 58. The direction change is fixed by the position of a snub roller 66 relative to the nose roller 54. The snub roller 66 is positioned ahead of, rather than after, the drive sprocket 44 on the drive path segment 58. A guide surface 68 at the nose roller 54 is angled in that direction 64. In this example, the travel direction changes by a nose angle 70 of about 130°. But nose angles greater than or equal to about 90° and less than 180° are possible—if the serpentine drive path segment is arranged appropriately to ensure proper sprocket-belt engagement.

The conveyor belt 32 travels in the oblique downward travel direction 64 from the nose roller 54 to the snub roller 66 on the drive path segment 58. Because the travel direction 64 is well off vertical, the conveyor belt 32 wraps around a large portion of the snub roller's periphery. In this example, the outer side 40 of the belt 32 contacts about 180° of arc around the snub roller's periphery.

The level L1 of the bottom dead center 72 of the snub roller 66 is below the level L2 of the top dead center 74 of the drive sprocket 44. Thus, the conveyor belt 32 travels against gravity on an upward slant from a release point 76 on the snub roller 66 to a point of initial engagement 78 on the periphery of the sprocket 44. That positioning of the snub roller 66 relative to the drive sprocket 44 increases the wrap of the belt 32 around the sprocket for reliable driving. A wrap of at least 135° results in effective belt-sprocket engagement.

Figure 1:
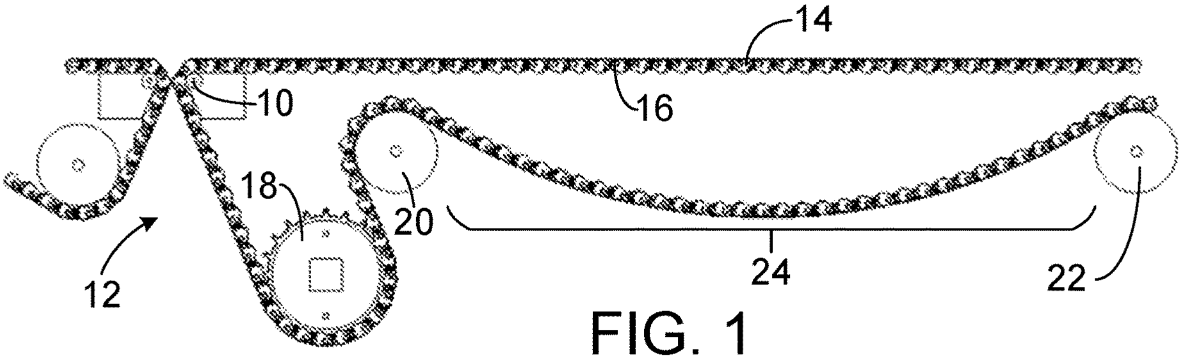
FIG. 1 Prior Art
FIG. 1 is a side elevation view of the exit end of a belt conveyor of the prior art.

Leaving the drive sprocket 44 at a release point 80 on the sprocket's periphery, the belt 32 forms a catenary sag in a take-up region defined by a take-up path segment 82 in the beginning portion of the returnway path segment 60. The take-up region extends immediately from the sprocket release point 80 to a returnway roller 84 on the returnway path segment 60. The returnway roller's top dead center 86 is shown above the sprocket's bottom dead center 88 to help form the catenary sag and to increase the amount of belt wrap around the sprocket 44. The length of the take-up region is much shorter than the length of the take-up region 24 of FIG. 1. And because the drive sprocket 44 is pushing the belt 32 into a descending catenary, rather than upward against gravity as in FIG. 1, the belt can be accelerated from a stop without any disengagement from the sprocket.

Figure 3:
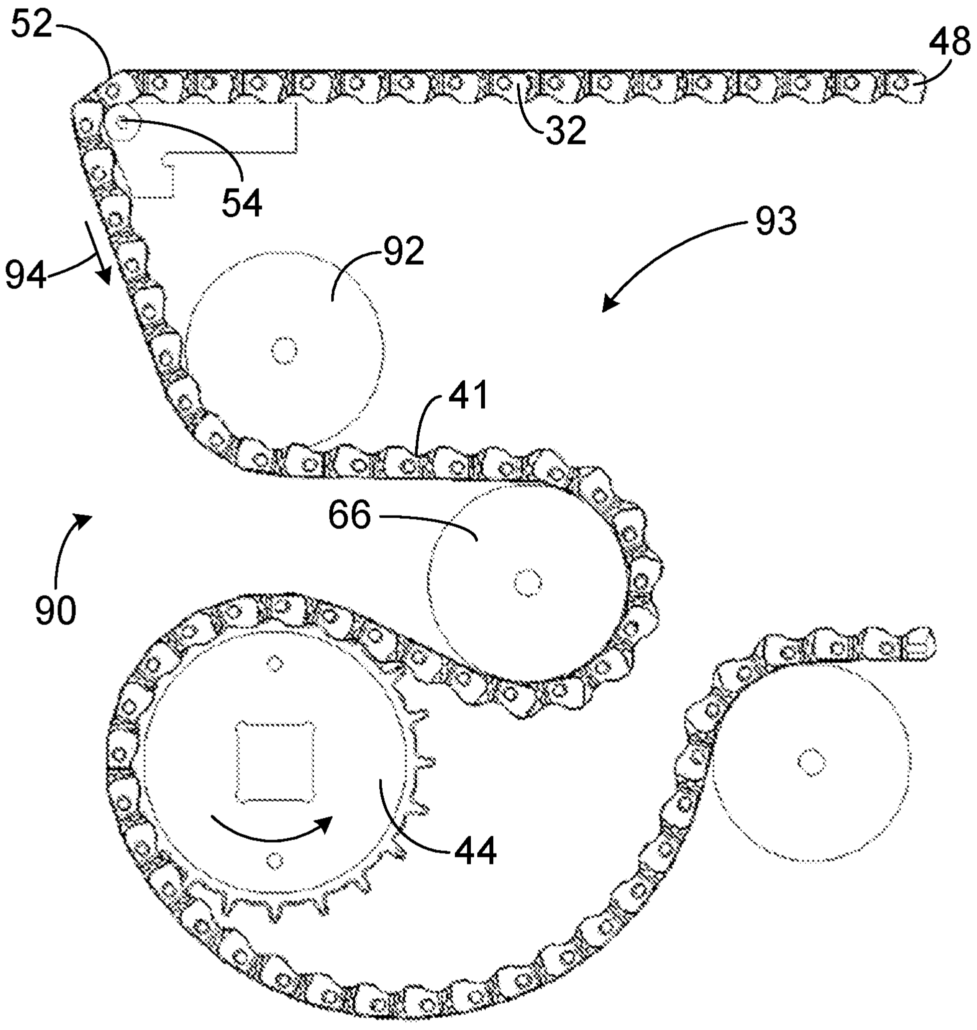
FIG. 3 is a side elevation view of the exit end of another version of a belt conveyor embodying features of the invention.

The belt conveyor 90 shown in FIG. 3 differs from the belt conveyor 30 of FIG. 2 in that an auxiliary roller 92 is positioned in the drive path segment 93 between the nose roller 54 and the snub roller 66. The auxiliary roller 92, which contacts the inner side 41 of the conveyor belt 32, acts like a snub roller to the sprocket's snub roller 66 by increasing the amount of belt wrap around the sprocket's snub roller. The auxiliary roller 92 is used because the nose angle in this version is about 110°-20° less than the 130° nose angle 70 in the belt conveyor 30 of FIG. 2. Because the belt 32 leaves the nose roller 54 on a more vertical, less oblique travel path 94, the auxiliary roller 92 alters the travel path so that the snub roller 66 and the drive sprocket 44 can be positioned below the exit end 52 of the carryway 48 and not outward of the exit end where they can interfere with structure outside the belt conveyor 90. Otherwise, the belt conveyors 30, 90 of FIGS. 2 and 3 are the same.

The short-pitch conveyor belts in the exemplary versions are shown and described as modular conveyor belts, which may be either non-collapsible straight-running belts or collapsible radius belts. But homogeneous thermoplastic belts that have regularly spaced drive-receiving elements and that are thin enough to bend around small-diameter nose bars or rollers could alternatively be used.

What is claimed is:

1. A belt conveyor comprising:
- a carryway having an exit end;
- a positively driven conveyor belt driven in a travel direction along a belt path including the carryway;
- a nose element at the exit end of the carryway around which the travel direction of the conveyor belt changes;
- a drive arrangement disposed below the exit end and including:
  - a drive sprocket positively driving the conveyor belt and having a top dead center;
  - a snub roller positioned between the nose element and the drive sprocket to guide the conveyor belt to be engaged by the drive sprocket at the top dead center;
- a returnway roller along the belt path after the drive sprocket, wherein the conveyor belt sags between a release point on the drive sprocket and the returnway roller to form a take-up region immediately after the drive sprocket.

2. The belt conveyor as claimed in claim 1 wherein the nose element is a nose roller or a nose bar.

3. The belt conveyor as claimed in claim 1 wherein the travel direction of the conveyor belt changes by 90° or more around the nose element.

4. The conveyor belt as claimed in claim 3 wherein the travel direction of the conveyor belt changes by between about 110° and about 130° as it rounds the nose element.

5. The conveyor belt as claimed in claim 1 wherein the snub roller has a top dead center and a bottom dead center and the level of the bottom dead center of the snub roller is lower than the level of the top dead center of the drive sprocket.

6. The conveyor belt as claimed in claim 5 comprising an auxiliary roller disposed along the belt path between the nose element and the snub roller to change the travel direction of the conveyor belt on the belt path to guide the conveyor belt to contact the snub roller at or near the top dead center of the snub roller.

7. The conveyor belt as claimed in claim 1 wherein the snub roller is positioned relative to the drive sprocket such that the conveyor belt travels on the belt path against gravity between the snub roller and the drive sprocket.

8. The belt conveyor as claimed in claim 1 wherein the snub roller is positioned relative to the drive sprocket to ensure that the conveyor belt wraps at least 135° around the drive sprocket.

9. The belt conveyor as claimed in claim 1 wherein the belt path around the snub roller and the drive sprocket is serpentine.

10. The belt conveyor as claimed in claim 1 wherein the conveyor belt forms a loop having an outer side and an opposite inner side and wherein the snub roller contacts the outer side and the drive sprocket positively engages the inner side in positive driving engagement.

11. The belt conveyor as claimed in claim 1 wherein the snub roller is positioned relative to the drive sprocket to ensure that the conveyor belt initially engages the drive sprocket at a point of initial engagement before the top dead center of the drive sprocket.

12. A belt conveyor comprising:
- a conveyor belt including an outer side and an opposite inner side having drive-receiving elements;

a carryway having an exit end;
a returnway below the carryway;
wherein the conveyor belt is driven in an endless belt path including:
a carryway path segment along which the conveyor belt conveys articles on the outer side in a conveying direction to the exit end;
a returnway path segment along which the conveyor belt is driven back to the carryway, wherein the returnway path segment includes a take-up path segment; and
a drive path segment extending from the carryway path segment at the exit end of the carryway to the take-up path segment of the returnway path segment;
a drive sprocket in the drive path segment and having a periphery with drive elements engaging the drive-receiving elements on the inner side of the conveyor belt to drive the conveyor belt along the endless path;
a snub roller in the drive path segment between the exit end of the carryway and the drive sprocket and in contact with the outer side of the conveyor belt as it changes direction around the snub roller to a release point at which the conveyor belt departs from the snub roller at a first level;
wherein the conveyor belt in the drive path segment is driven from the snub roller to a point of initial engagement on the drive sprocket at a second level;
wherein the first level is lower than the second level so that the conveyor belt travels against gravity between the snub roller and the drive sprocket.

13. The belt conveyor as claimed in claim 12 comprising an auxiliary roller on the drive path segment between the snub roller and the exit end of the carryway positioned to divert the conveyor belt in a direction opposite to the conveying direction.

14. The belt conveyor as claimed in claim 12 comprising an auxiliary roller on the drive path segment between the snub roller and the exit end of the carryway positioned to increase the amount of wrap of the conveyor belt around the snub roller's periphery compared to the amount of wrap without the auxiliary roller.

15. The belt conveyor as claimed in claim 12 comprising a nose element at the exit end of the carryway around which the conveyor belt changes direction from the conveying direction along the carryway by an angle of between about 110° and about 130°.

16. The belt conveyor as claimed in claim 12 wherein the snub roller is positioned relative to the drive sprocket to ensure that the conveyor belt engages the drive sprocket over at least 135° of the drive sprocket's periphery.

17. The belt conveyor as claimed in claim 12 wherein the drive path segment is serpentine.

18. The belt conveyor as claimed in claim 12 comprising a returnway roller along the belt path after the drive sprocket, wherein the conveyor belt sags between a release point on the drive sprocket and the returnway roller to form the take-up path segment immediately after the drive sprocket.

* * * * *